(No Model.)
E. WILLIAMS.
AXLE COUPLING.
No. 354,820. Patented Dec. 21, 1886.
Fig. 1.
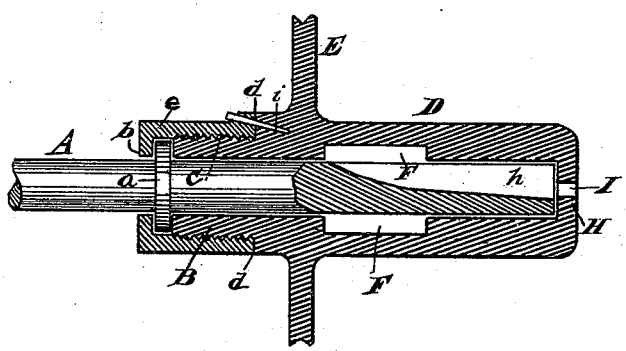
Fig. 2.
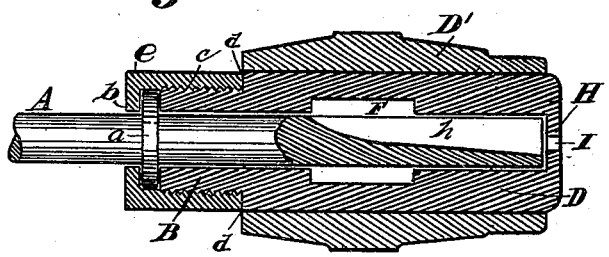
Fig. 3.
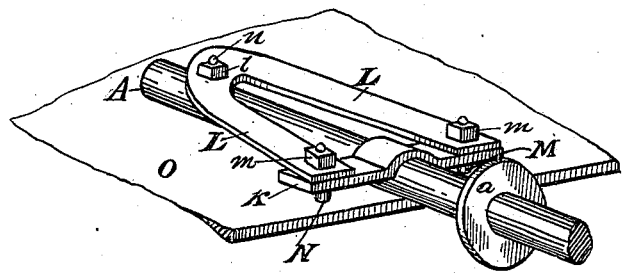
Fig. 4.
Attest
J. Watson Sims
J. Simpson Roebuck
Inventor
Ebenezer Williams
by Wood & Boyd
his Attorneys &c

UNITED STATES PATENT OFFICE.

EBENEZER WILLIAMS, OF MINERSVILLE, OHIO, ASSIGNOR OF ONE-HALF TO JOHN E. WILLIAMS, OF SAME PLACE.

AXLE-COUPLING.

SPECIFICATION forming part of Letters Patent No. 354,820, dated December 21, 1886.

Application filed August 17, 1886. Serial No. 211,149. (No model.)

*To all whom it may concern:*

Be it known that I, EBENEZER WILLIAMS, a citizen of the United States, and a resident of Minersville, in the county of Meigs and State of Ohio, have invented certain new and useful Improvements in Wheel and Axle Couplings, of which the following is a specification.

My invention relates to improved means for connecting the axle to the body of the vehicle, and for lubricating the axle and hub; and it consists in the construction and combination of devices, as hereinafter set forth.

Figure 1 represents a central vertical longitudinal section of my improvement attached to the axle. Fig. 2 is a similar view, being a modification of the construction shown in Fig. 1. Fig. 3 is a bottom perspective view of the means for attaching the axle to the frame of the vehicle. Fig. 4 is a perspective view of the axle for the purpose of showing the oil-groove.

In the drawings, the letter A indicates the axle, having a rigidly-attached collar, a; D, the metallic box, formed at one end with a sleeve or extension, B, provided with external screw-threads, c. As shown in Fig. 2, this box D may form the lining of the hub D', or, as shown in Fig. 1, it may constitute the hub proper, from which project the spokes or disk E for supporting the rim of the wheel.

e represents a tubular nut, which is provided with screw-threads, that engage with screw-threads c of the sleeve B.

d represents a shoulder formed on the hub D, against which the nut e rests when the parts are secured together. The interior of the hub D is bored out to form a bearing for the shaft A, which journals therein.

The inner end of the screw-threaded nut e terminates in close proximity to the collar a. The flange b of the screw-threaded nut e serves as a stop against the collar a, to limit the lateral movement of the wheel-hub upon the axle and lock and hold it in position.

i represents one of the ordinary forms of locking devices for preventing the hub D from being unscrewed. It consists of a pin which enters a diagonal hole bored through from the nut e into the hub D, and the pin is inserted therein, which prevents the unscrewing of the hub. Any other form of locking device may be employed.

In order to lubricate the parts I have provided the following instrumentalities: I represents an orifice pierced through the front flange, H, of the hub D, and forming a passage for admitting oil into the interior of the sleeve. F represents a gain or annular recess formed in the hub, so as to furnish a chamber for holding oil. h represents a groove or gain cut in the top of the axle, its lower front edge terminating below the oil-orifice I. Oil is injected into the groove or gain h through the orifice I. As the hub D revolves, the oil is carried up on its inner periphery and drops into the groove h, and runs back to the end of the axle, and thence back into the chamber F. The oil is intended to fill the interstices around the axle, a sufficient amount being introduced to fill the box partly full. The collar a dips freely into this oil, and the parts are lubricated as the wheel-hub is revolved.

Fig. 3 represents an improved method of fastening the axle to the frame of the vehicle. K represents a clamp-bar, which is provided with a semicircular shoulder fitting over the axle a. L represents a V-shaped yoke, the free ends of which rest upon the clamp K and the inner or bent end under the top of the axle. M N represent bolts passing through the frame O of the vehicle and through the clamp-bar K and yoke L. m represents nuts tapping on the bolts, which are screwed down to clamp the parts together and rigidly bind them to the axle. n represents a through-bolt passing through the frame and through the center of the axle. l represents a nut for clamping the yoke upon the axle and holding it in position. This method of attaching the axle is at once cheap, rigid, and convenient.

The parts are easily made, readily detachable, and yet hold the axle firmly against all strains.

Having described my invention, what I claim as new is—

1. The combination of the box D, having an annular chamber, F, and an end opening, I, and the axle A, having a longitudinal groove, h, communicating with said chamber and opening, substantially as shown and described.

2. The combination, with the stationary axle A and the frame O of a vehicle, of the clamp-bar K, extending across the axle, the yoke L, having its rear end bearing on the axle and its front ends resting on the clamp-bar, and bolts and nuts clamping the yoke and clamp-bar to the vehicle-frame, substantially as and for the purposes described.

In testimony whereof I have hereunto set my hand.

E. WILLIAMS.

Witnesses:
L. H. LEE,
J. CARTWRIGHT.